United States Patent [19]
Kim

[11] Patent Number: 5,881,177
[45] Date of Patent: Mar. 9, 1999

[54] QUANTIZER FOR VIDEO SIGNAL ENCODING SYSTEM

[75] Inventor: Min-Nyeon Kim, Seoul, Rep. of Korea

[73] Assignee: Daewoo Electronics Co., Ltd., Seoul, Rep. of Korea

[21] Appl. No.: 854,945

[22] Filed: May 14, 1997

[30] Foreign Application Priority Data

May 14, 1996 [KR] Rep. of Korea ...................... 96-16003
May 14, 1996 [KR] Rep. of Korea ...................... 96-16004

[51] Int. Cl.$^6$ ............................................... H04N 9/00
[52] U.S. Cl. .......................... 382/251; 382/250; 348/401; 348/405; 341/200; 364/725.03; 364/765
[58] Field of Search .................... 382/251, 250; 348/405, 404, 396, 401; 341/200; 364/765, 715.2, 716.07, 725.01, 725.03, 748.08; 358/432; 395/200.77, 573, 888

[56] References Cited

U.S. PATENT DOCUMENTS

| | | | |
|---|---|---|---|
| 4,884,265 | 11/1989 | Schroeder et al. | 370/484 |
| 5,012,438 | 4/1991 | Yamaguchi | 364/765 |
| 5,295,077 | 3/1994 | Fukuoka | 358/479 |
| 5,410,352 | 4/1995 | Watanabe | 348/405 |
| 5,537,147 | 7/1996 | Tahara | 348/400 |
| 5,563,593 | 10/1996 | Puri | 341/67 |
| 5,617,094 | 4/1997 | Kim | 341/200 |
| 5,623,311 | 4/1997 | Phillips et al. | 348/396 |

*Primary Examiner*—Jon Chang
*Assistant Examiner*—David J. Rosenblum
*Attorney, Agent, or Firm*—Pillsbury Madison & Sutro LLP

[57] ABSTRACT

A quantizer for quantizing scanned DCT coefficients in a video encoder is disclosed. The quantizer comprises a memory having a first bank with a plurality of areas for storing an inter quantization matrix and a second bank with a plurality of areas for storing an intra quantization matrix; a memory controller for generating a write address for writing the inter quantization matrix and the intra quantization matrix in the memory in an order of zigzag scanning manner, and a read address for reading a corresponding quantization matrix from the memory in an order of a scanning manner of the DCT coefficients, and controlling a write/read operation of the inter quantization matrix and the intra quantization matrix in the memory according to the write address and the read address; an arithmetic controller for obtaining a reciprocal value of the corresponding quantization matrix from the memory via the memory controller and a reciprocal value of a quantization scale provided externally and outputting the obtained value; and an arithmetic unit for quantizing the scanned DCT by using the reciprocal values of the corresponding quantization matrix and the quantization scale. Thus, a corresponding quantization matrix can be read from a memory without data collision, in accordance with scanned manner of DCT coefficients.

7 Claims, 6 Drawing Sheets

FIG.3A (PRIOR ART)

|    | X  →  |    |    |    |    |    |    |
|----|----|----|----|----|----|----|----|
| 00 | 01 | 05 | 06 | 0E | 0F | 1B | 1C |
| 02 | 04 | 07 | 0D | 10 | 1A | 1D | 2A |
| 03 | 08 | 0C | 11 | 19 | 1E | 29 | 2B |
| 09 | 0B | 12 | 18 | 1F | 28 | 2C | 35 |
| 0A | 13 | 17 | 20 | 27 | 2D | 34 | 36 |
| 14 | 16 | 21 | 26 | 2E | 33 | 37 | 3C |
| 15 | 22 | 25 | 2F | 32 | 38 | 3B | 3D |
| 23 | 24 | 30 | 31 | 39 | 3A | 3E | 3F |

FIG.3B (PRIOR ART)

|    | X  →  |    |    |    |    |    |    |
|----|----|----|----|----|----|----|----|
| 00 | 01 | 05 | 06 | 0E | 0F | 1B | 1C |
| 02 | 04 | 07 | 0D | 10 | 1A | 1D | 2A |
| 03 | 08 | 0C | 11 | 19 | 1E | 29 | 2B |
| 09 | 0B | 12 | 18 | 1F | 28 | 2C | 35 |
| 0A | 13 | 17 | 20 | 27 | 2D | 34 | 36 |
| 14 | 16 | 21 | 26 | 2E | 33 | 37 | 3C |
| 15 | 22 | 25 | 2F | 32 | 38 | 3B | 3D |
| 23 | 24 | 30 | 31 | 39 | 3A | 3E | 3F |

QUANTIZER FOR VIDEO SIGNAL ENCODING SYSTEM

BACKGROUND OF THE INVENTION

1. Field of the Invention

The present invention relates to a quantizer and more particularly to a quantizer for quantizing scanned Discrete Cosine Transform (DCT) coefficients in a video signal encoding system.

2. Description of the Prior Art

FIG. 1 shows a block diagram of a conventional MPEG-2 video encoder comprising a frame memory, a subtracter (SUB), a Discrete Cosine Transform unit (DCT unit), a quantizer (Q), a scanning unit, a Variable Length Coding unit (VLC unit), an inverse quantizer (IQ), an Inverse Discrete Cosine Transform unit (IDCT unit), an adder (ADD), and a motion compensator (MC).

In FIG. 1, a differential video signal between a current video signal from the frame memory and a previous video signal motion-compensated in the motion compensator is calculated in the subtracter, and outputted to the DCT unit. In the DCT unit, the differential video signal is converted into DCT coefficients. The DCT coefficients are quantized in the quantizer, and the quantized DCT coefficients are outputted to the scanning unit and the inverse quantizer. In the scanning unit, the quantized two-dimension DCT coefficient series are converted into one-dimension coefficient series, and are outputted to the VLC unit or a Run Length Coding unit (RLC unit) for generating a final coded bit-stream.

As described above, in the conventional MPEG-2 video encoder, the scanning is performed after the video data have been quantized. However, due to the problem of latency caused by the structural restraint of the conventional video encoder, there has been a need for video encoder in which the scanning is performed prior to quantization of the video signals.

FIG. 2 shows a differential circuit except a motion compensator of a video encoder in which the scanning is performed prior to quantization. The video encoder comprises a orthogonal transform unit, a scanning unit, a quantizer, and a coding unit. In the orthogonal transform unit, input video signals are converted by DCT. In the scanning unit, the converted two dimension DCT coefficients are converted into one dimension coefficient series to be quantized. In the coding unit, the quantized one-dimension coefficient series are coded by a VLC or a RLC to generate a coded bit-stream. The video encoder similar to the above is disclosed in U.S. Pat. No. 5,369,439.

In the MPEG-1 video encoder, the DCT coefficients, as shown in FIG. 3A, are converted to the one dimension coefficient series by a zigzag scanning. An alternate scanning, as shown in FIG. 3B, or the zigzag scanning may be used selectively in picture units in the MPEG-2 video encoder. This alternate scanning can also be efficiently used in an interlaced scanning screen.

However, as shown in FIG. 2, when the scanning is performed before quantization, the quantizer must provide quantization matrixes corresponding to the zigzag and alternate scanning manner of the scanning unit. In MPEG-2 video encoder, the quantization is of adaptive quantization, since a weighted value is changed according to a spatial frequency. Accordingly, a matrix for quantizing an intra block (intra quantization matrix) and a matrix for quantizing, an inter block (inter quantization matrix) are required according to the coding mode. In the quantizer, only the zigzag manner is required for an input order of the matrix, however, an input order of video data changes by the scanning manner. Accordingly, in order to quantize the scanned DCT coefficients, the order of quantization matrix should correspond with the order of input video data affected by the scanning manner. Particularly, input video data couples should match quantization matrix couples when processing two pixels by 16 bits for a fast video coding in the quantizer.

SUMMARY OF THE INVENTION

In view of the foregoing, it is an object of the present invention to provide a quantizer for quantizing scanned DCT coefficients, which reads in a zigzag order or an alternate order, according to a scanned manner of DCT coefficients, a quantization matrix stored in a memory in a zigzag order and quantizes one dimension DCT coefficients.

In order to achieve the above object, the present invention provides a quantizer for quantizing scanned DCT comprising:

a memory having a first bank, which is constructed with a plurality of areas for storing an inter quantization matrix; and a second bank, which is constructed with a plurality of areas for storing an intra quantization matrix;

a memory control unit for generating a write address for writing the inter quantization matrix and the intra quantization matrix in the memory in a zigzag order, and a read address for reading corresponding quantization matrix from the memory in accordance with the scanned manner of the DCT coefficients, and controlling a write/read process for the inter quantization matrix and the intra quantization matrix in the memory according to the write address and the read address;

an arithmetic controller for obtaining and outputting a reciprocal value of corresponding quantization matrix from the memory control unit and a reciprocal value of a quantization scale supplied externally; and an arithmetic unit for quantizing the scanned DCT coefficients by using the quantization scale value and the quantization matrix value from the arithmetic controller.

BRIEF DESCRIPTION OF THE DRAWINGS

The above and other objects, features, and advantages of the present invention will be apparent from the following detailed description of the preferred embodiments of the invention in conjunction with the accompanying drawings, in which:

FIG. 3A to 3B are views illustrating a zigzag scanned and an alternate scanned DCT coefficients;

DESCRIPTION OF THE PREFERRED EMBODIMENT

Reference will now be made in detail to the present invention, examples of which are illustrated in the accompanying drawings. Wherever possible, the same reference numbers will be used throughout the drawings to refer to the same or like parts.

Figure 1:
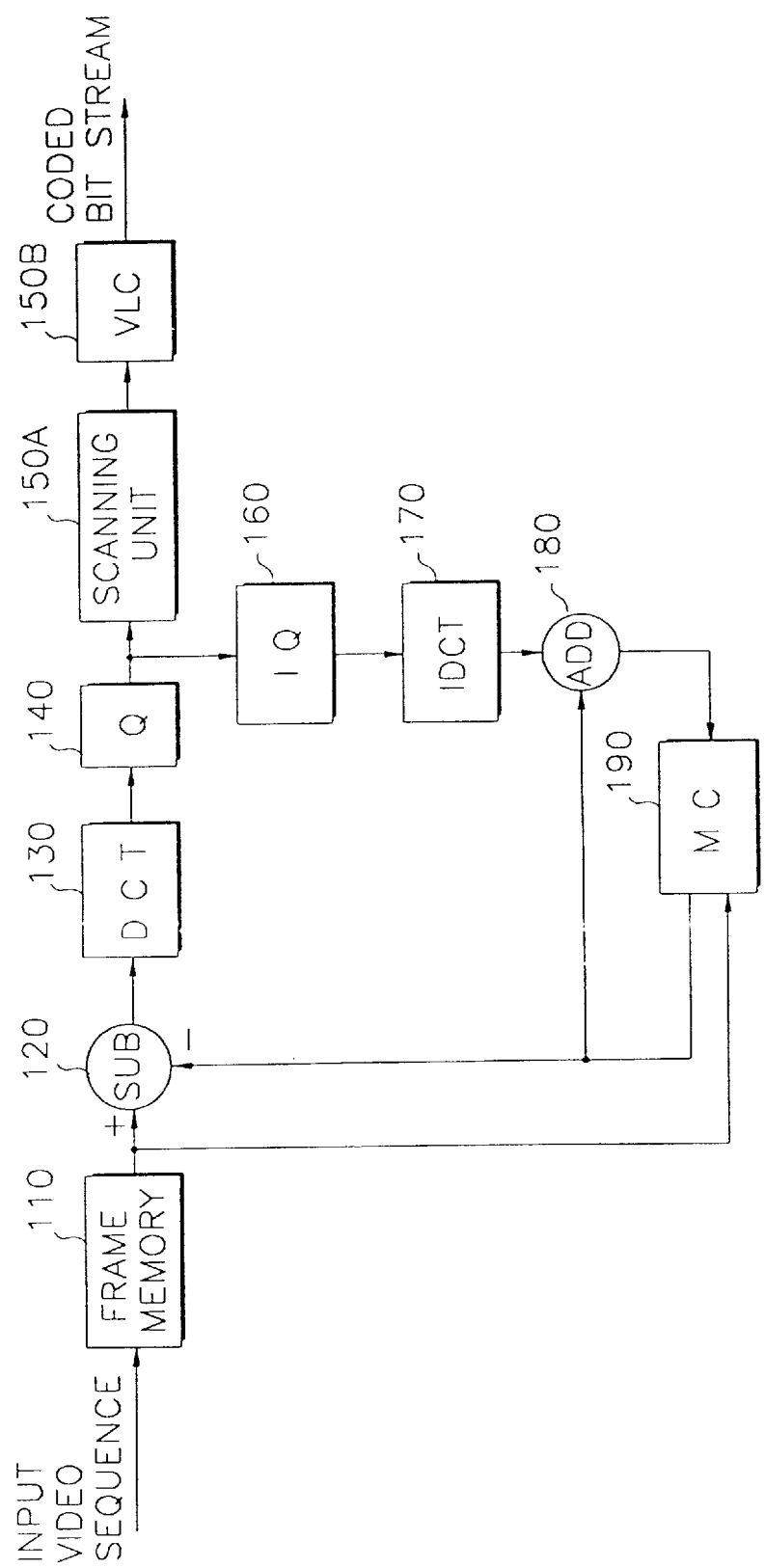
FIG. 1 is a block diagram illustrating an embodiment of the conventional video encoder.
Figure 2:
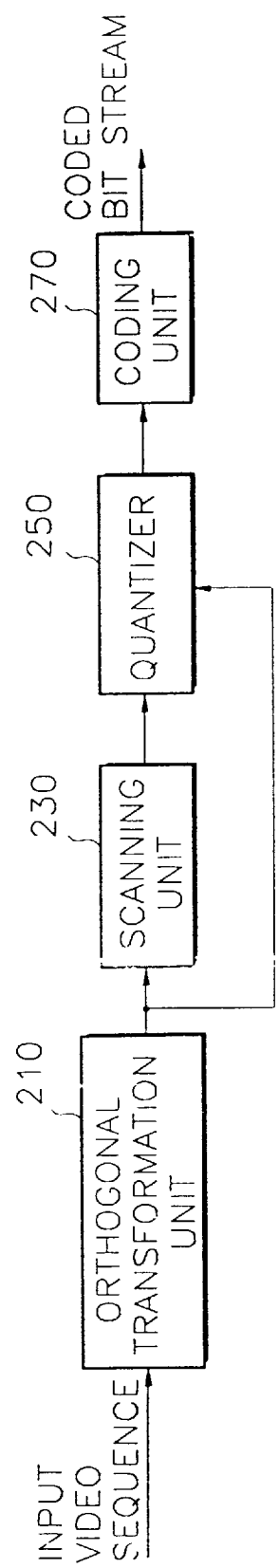
FIG. 2 is a block diagram illustrating an another embodiment of the conventional video encoder.
Figure 4:
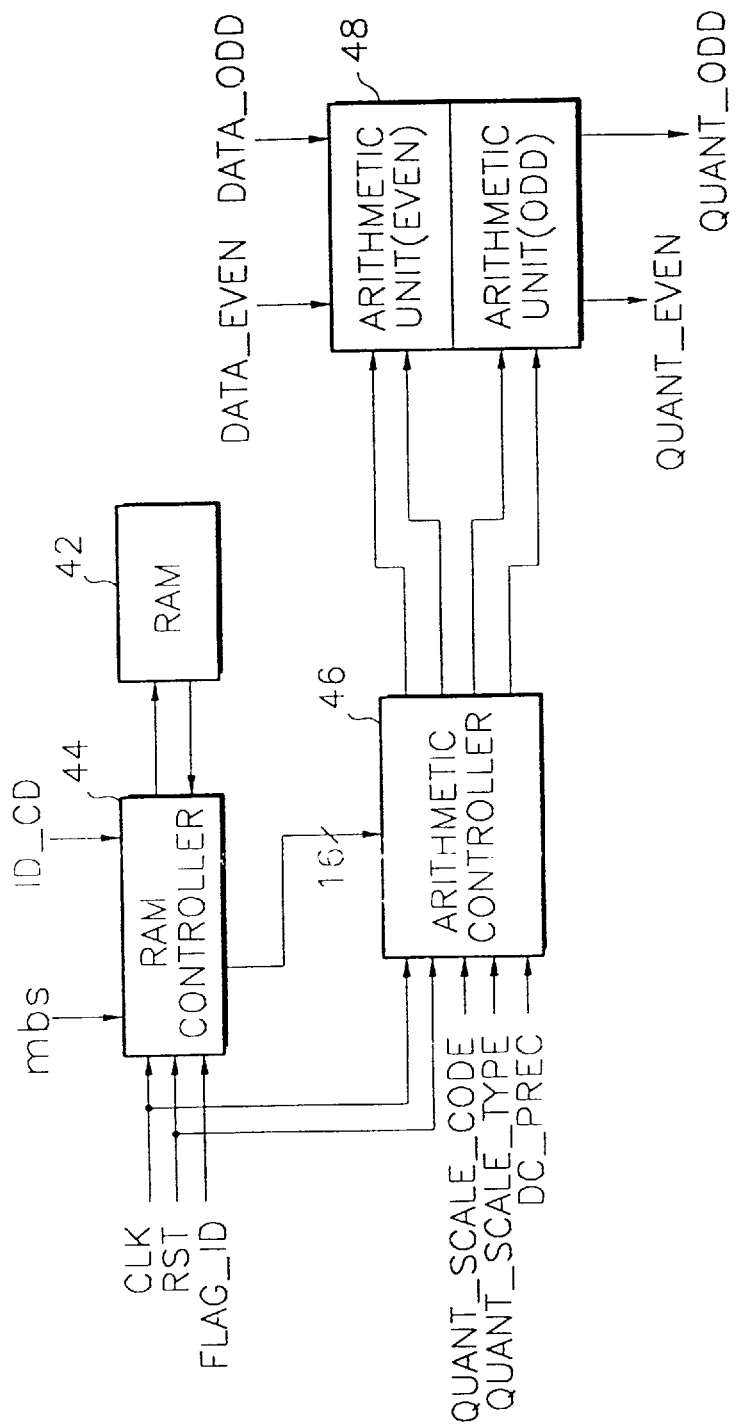
FIG. 4 is a block diagram illustrating a quantizer in accordance with the present invention.

FIG. 4 shows a block diagram of a quantizer in accordance with the present invention. The quantizer comprises a memory, namely a RAM 42 for storing an inter quantization matrix and an intra quantization matrix; a RAM controller 44 for generating a write address of a zigzag order and a read address in accordance with a scanned manner of DCT coefficients, and for controlling a read/write process of the quantization matrix from the RAM 42 according to the read/write address; an arithmetic controller 46 for obtaining and outputting a reciprocal value of a quantization scale and a reciprocal value of corresponding quantization matrix from the RAM 42; and an arithmetic unit 48 for quantizing the scanned DCT coefficients by using the quantization scale value and the quantization matrix value from the arithmetic controller 46.

Figure 5:
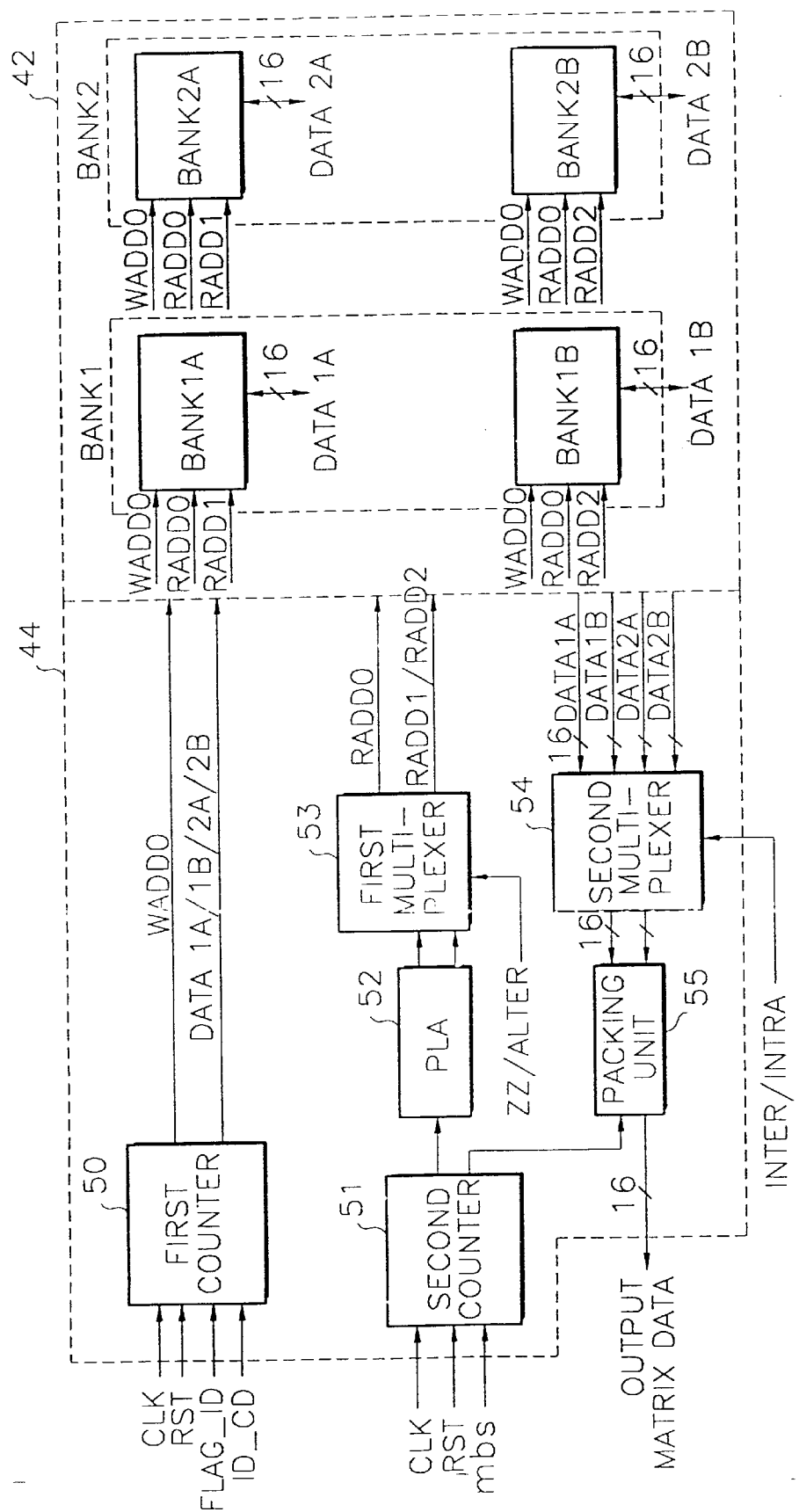
FIG. 5 is a detailed block diagram illustrating a RAM and a RAM controller in accordance with a first preferred embodiment of the present invention.

FIG. 5 shows a detailed block diagram of a RAM 42 and a RAM controller 44 in accordance with the first preferred embodiment. In FIG. 5, the RAM 42 comprises a first bank BANK1 for storing the inter quantization matrix and a second bank BANK2 for storing the intra quantization matrix. The first bank BANK1 comprises a first sub-RAM BANK1A and a second sub-RAM bank BANK1B for storing the same inter quantization matrix. The second bank BANK2 comprises a third sub-RAM BANK2A and a fourth sub-RAM BANK2B for storing the same intra quantization matrix. The first sub-RAM to fourth sub-RAM BANK1A, BANK1B, BANK2A, BANK2B are 16 bits×32 words in their size.

The RAM controller 44 comprises a write address generator, a first counter 50, for generating a write address to store the inter quantization matrix and the intra quantization matrix into the RAM 42; a read address generator comprising a second counter 51, a programmable logic array (PLA) 52, and a first multiplexer 53, for generating a read address to read a corresponding quantization matrix from the RAM 42 in accordance with the scanned manner of the DCT coefficients; a data combiner comprising a second multiplexer 54 and a packing unit 55, for combining the quantization matrix from the RAM 42 to form 16 bit data according to a coding mode or the scanning order.

Input/output signals into/from each block need to be defined and elaborated prior to describing each operation of the above quantizer.

Of input signals to the RAM controller 44, "CLK" and "RST" indicate a system clock and a reset signal for active low operation, respectively. In "ID_CD", identifier ID represents a quantization matrix (namely, inter quantization matrix or intra quantization matrix) and CD represents succeeding quantization matrix data. "FLAG_ID" indicates that the current input ID_CD is valid. For example, ID_CD is read and the succeeding quantization matrix data CD is read in two pixel units, namely 16 bit if FLAG_ID is a "high" logic level. "mbs" indicates a macro block start.

Of input signals to the arithmetic controller 46, "QUANT_SCALE_CODE" and "QUANT_SCALE_TYPE" are signals for indicating a quantization scale in MPEG-2. "DC_PREC" indicates a size (accuracy) of DC coefficient of an intra block defined in MPEG-2; for example, the DC coefficient is represented to 8 bit if it is 0 and the coefficient is represented to 11 bit if it is 3.

Of input signals to the arithmetic unit 48, "DATA_EVEN" and "DATA_ODD" indicate even and odd data of two pixel units converted by the DCT, respectively. Of output signals from the arithmetic unit 48, "QUANT_EVEN" and "QUANT_ODD" are quantized output data of the input even and the odd data in two pixel units.

Referring to an operation of each block in FIG. 5, the inter quantization matrix data are stored in the first and the second sub-RAM BANK1A, BANK1B of the first bank BANK1 of the RAM 42 in 16 bit units. The intra quantization matrix data are stored in the third and the fourth sub-RAM BANK2A, BANK2B of the second bank BANK2 of the RAM 42 in 16 bit units. In the first sub-RAM BANK1A and the second sub-RAM BANK1B of the first bank BANK1, the same inter quantization matrix data are stored in 16 bit units in 32 areas that are indicated by a write address WADD0. In the third and the fourth sub-RAM BANK2A, BANK2B of the second bank BANK2, the same intra quantization matrix data are stored in 16 bit units in the 32 areas, which is indicated by a write address WADD0. The inter and the intra quantization matrix data are supplied from a system control unit (not shown), and they may be an user defined matrix or a default matrix defined in MPEG-2.

The RAM controller 44 is operated by a system clock CLK and a reset signal RST. The quantization matrix inputted through ID_CD is stored in an corresponding bank of the RAM 42 according to the write address WADD0. The quantization matrix in the RAM 42 is read by the read address RADD0 when the DCT coefficients are scanned in the zigzag order, whereas it is read by read addresses RADD1, RADD2 when the DCT coefficients are scanned in the alternate order. The read quantization matrix is outputted to the arithmetic controller 46. Namely, in the RAM controller 44, ID_CD is analyzed to identify the quantization matrix when FLAG_ID is a "high" logic level, and analyzed input quantization matrix is stored in corresponding sub-RAMs of banks of the RAM 42 according to the write address WADD0. Additionally, the quantization matrixes stored in the sub-RAMs are synchronized by the macro block start signal and they are read and outputted to the arithmetic controller 46 according to the read address RADD0 and the read addresses RADD1, RADD2 which correspond to the scanning manner. Each sub-RAM has a control signal for reading and writing (not shown), and a control signal for enabling an output (not shown). The control signals are supplied when the corresponding sub-RAM is selected by the RAM controller 44.

Referring to FIG. 5, the first counter 50 (5 bits counter) counts $00_H$ to $3F_H$ according to a clock signal CLK after clearing a count value by reset signal RST. 32 write addresses WADD0 are generated to store the quantization matrix data from the system control unit (not shown) in the first and second sub-RAMs BANK1A, BANK1B, and the third and the fourth sub-RAMs BANK2A, BANK2B in 16 bit units. Examples of the write address WADD0 is represented in the following table 1.

TABLE 1

| Write Address | |
|---|---|
| count value of the first counter (50) | WADD0 address (data) |
| 00 | 00 (00, 01) |
| 01 | 01 (02, 03) |
| 02 | 02 (04, 05) |
| 03 | 03 (06, 07) |
| 04 | 04 (08, 09) |
| 05 | 05 (0A, 0B) |
| 06 | 06 (0C, 0D) |
| 07 | 07 (0E, 0F) |

TABLE 1-continued

Write Address

| count value of the first counter (50) | WADD0 address (data) |
|---|---|
| 08 | 08 (10, 11) |
| 09 | 09 (12, 13) |
| 0A | 0A (14, 15) |
| 0B | 0B (16, 17) |
| 0C | 0C (18, 19) |
| 0D | 0D (1A, 1B) |
| 0E | 0E (1C, 1D) |
| 0F | 0F (1B, 1F) |
| 10 | 10 (20, 21) |
| 11 | 11 (22, 23) |
| 12 | 12 (24, 25) |
| 13 | 13 (26, 27) |
| 14 | 14 (28, 29) |
| 15 | 15 (2A, 2B) |
| 16 | 16 (2C, 2D) |
| 17 | 17 (2E, 2F) |
| 18 | 18 (30, 31) |
| 19 | 19 (32, 33) |
| 1A | 1A (34, 35) |
| 1B | 1B (36, 37) |
| 1C | 1C (38, 39) |
| 1D | 1D (3A, 3B) |
| 1E | 1E (3C, 3D) |
| 1F | 1F (3E, 3F) |

The above table 1 shows when the inter quantization matrix is stored in the first and the second sub-RAM BANK1A, BANK1B. The matrix data couple (00, 01) are stored in the area '00' indicated by the read address WADD0 when the count value is $00_{16}$. The matrix data couple (02, 03) are stored in the area 01 indicated by read address WADD0 when the count value is $01_{16}$. Namely, each inter quantization matrix couple is stored sequentially in the zigzag order, as shown in FIG. 3A, in the areas $00_{16}1F_{16}$ indicated by the write address. In the same manner, each intra quantization matrix couple is stored sequentially in the zigzag order in the areas $00_{16}$–$1F_{16}$ of the third and the fourth sub-RAM BANK2A, BANK2B.

The second counter 51 (5 bit counter) counts $00_H$ to $1F_H$ according to the clock signal CLK after clearing the count value by the reset signal RST. After clearing, a rising edge of the macro block start signal mbs is detected in the second counter 51 and 32 count values are outputted to a PLA 52 and a packing unit 55.

As shown in the following tables 2 and 3, in the PLA 52, the read address RADD0 is generated according to the zigzag scanning of the DCT coefficients and the count value of the second counter 51. In addition, in the PLA 52, the read addresses RADD1, RADD2 are also generated according to the alternate scanning of the DCT coefficients and the count value of the second counter 51.

TABLE 2

Read Addresses (Zigzag Scanning)

| count value of the second counter (51) | RADD0 address (data) |
|---|---|
| 00 | 00 (00, 01) |
| 01 | 01 (02, 03) |
| 02 | 02 (04, 05) |
| 03 | 03 (06, 07) |
| 04 | 04 (08, 09) |
| 05 | 05 (0A, 0B) |
| 06 | 06 (0C, 0D) |
| 07 | 07 (0E, 0F) |

TABLE 2-continued

Read Addresses (Zigzag Scanning)

| count value of the second counter (51) | RADD0 address (data) |
|---|---|
| 08 | 08 (10, 11) |
| 09 | 09 (12, 13) |
| 0A | 0A (14, 15) |
| 0B | 0B (16, 17) |
| 0C | 0C (18, 19) |
| 0D | 0D (1A, 1B) |
| 0E | 0E (1C, 1D) |
| 0F | 0F (1E, 1F) |
| 10 | 10 (20, 21) |
| 11 | 11 (22, 23) |
| 12 | 12 (24, 25) |
| 13 | 13 (26, 27) |
| 14 | 14 (28, 29) |
| 15 | 15 (2A, 2B) |
| 16 | 16 (2C, 2D) |
| 17 | 17 (2E, 2F) |
| 18 | 18 (30, 31) |
| 19 | 19 (32, 33) |
| 1A | 1A (34, 35) |
| 1B | 1B (36, 37) |
| 1C | 1C (38, 39) |
| 1D | 1D (3A, 3B) |
| 1E | 1E (3C, 3D) |
| 1F | 1F (3E, 3F) |

The above table 2 shows examples of the inter quantization matrix read from the first and the second sub-RAMs BANK1A, BANK1B. In the first and the second sub-RAM BANK1A, BANK1B, the matrix data couple (00, 01) stored in the area '00' are read by the read address RADD0 when the count value is $00_{16}$. In the first and the second sub-RAM BANK1A, BANK1B, the matrix data couple (02, 03) stored in the area '01' are by the read address RADD0 when the count value is $01_{16}$. Namely, each matrix data couples stored in the areas $00_{16}1F_{16}$ indicated by the read address RADD0 are read sequentially in the zigzag order as shown in FIG. 3A. In the same manner, each intra quantization matrix data couples stored in the areas $00_{16}1F_{16}$ of the third and fourth sub-RAMs BANK2A, BANK2B are read sequentially in the zigzag order. Referring to the tables 1 and 2, the write address WADD0 correspond with the read address RADD0 when the DCT coefficients are scanned in the zigzag.

TABLE 3

Read Address (Alternate Scanning)

| count value of the second counter (51) | RADD1 address (data) | RADD2 address (data) |
|---|---|---|
| 00 | 00 (00, 01) | 01 (02, 03) |
| 01 | 01 (02, 03) | 04 (08, 09) |
| 02 | 02 (04, 05) | 00 (00, 01) |
| 03 | 03 (06, 07) | 02 (04, 05) |
| 04 | 04 (08, 09) | 05 (0A, 0B) |
| 05 | 05 (0A, 0B) | 0A (14, 15) |
| 06 | 0A (14, 15) | 11 (22, 23) |
| 07 | 11 (22, 23) | 12 (24, 25) |
| 08 | 0B (16, 17) | 09 (12, 13) |
| 09 | 09 (12, 13) | 06 (0C, 0D) |
| 0A | 06 (0C, 0D) | 03 (06, 07) |
| 0B | 07 (0E, 0F) | 08 (10, 11) |
| 0C | 08 (10, 11) | 0C (18, 19) |
| 0D | 10 (20, 21) | 0B (16, 17) |
| 0E | 12 (24, 25) | 18 (30, 31) |
| 0F | 13 (26, 27) | 10 (20, 21) |
| 10 | 18 (30, 31) | 17 (2E, 2F) |
| 11 | 0C (18, 19) | 0F (1E, 1F) |
| 12 | 0D (1A, 1B) | 07 (0E, 0F) |

TABLE 3-continued

Read Address (Alternate Scanning)

| count value of the second counter (51) | RADD1 address (data) | RADD2 address (data) |
|---|---|---|
| 13 | 0E (1C, 1D) | 0D (1A, 1B) |
| 14 | 0F (1E, 1F) | 14 (28, 29) |
| 15 | 17 (2E, 2F) | 13 (26, 27) |
| 16 | 19 (32, 33) | 1C (38, 39) |
| 17 | 16 (2C, 2D) | 19 (32, 33) |
| 18 | 1C (38, 39) | 1D (3A, 3B) |
| 19 | 14 (28, 29) | 16 (2C, 2D) |
| 1A | 15 (2A, 2B) | 0E (1C, 1D) |
| 1B | 1A (34, 35) | 15 (2A, 2B) |
| 1C | 1B (36, 37) | 1A (34, 35) |
| 1D | 1D (3A, 3B) | 1F (3E, 3F) |
| 1E | 1E (3C, 3D) | 1B (36, 37) |
| 1F | 1F (3E, 3F) | 1E (3C, 3D) |

The above table 3 shows the inter quantization matrix read from the first and the second sub-RAMs BANK1A, BANK1B. When the count value is $00_{16}$, the matrix data couple (00, 01) stored in the area '00' are read by the read address RADD1 in the first sub-RAM BANK1A, and the matrix data couple (02, 03) stored in the area '01' are read by the read address RADD2 in the second sub-RAM BANK1B. When the count value is $01_{16}$, the matrix data couple (02, 03) stored in the area '01' are read by the read address RADD1 in the first sub-RAM BANK1A, and the matrix data couple (08, 09) stored in the area '04' are read by the read address RADD2 in the second sub-RAM BANK1B. Namely, matrix data couples that are stored in the areas of the first and the second sub-RAM BANK1A, BANK1B indicated by each read address RADD1, RADD2, are read in the same order as shown in FIG. 3B according to the count values $00_{16}$–$1F_{16}$ of the second counter 51. In the same manner, for the intra quantization matrix, matrix data couples that are stored in the areas of the third and the fourth sub-RAM BANK2A, BANK2B indicated by each read address RADD1, RADD2, are read in the same order as shown in FIG. 3B according to the count values $00_{16}$–$1F_{16}$ of the second counter 51.

In the multiplexer 53, the read address of the zigzag order RADD0 or the read address of the alternate order RADD1, RADD2 from the PLA 52 is outputted selectively to the RAM 42 according to a scanning manner discriminating signal ZZ/ALTER from the system control unit (not shown). For example, the read address RADD0 of zigzag order, as shown in the table 2, from the PLA 52 is selected by the first multiplexer 53 when the DCT coefficients are scanned in the zigzag manner. The selected read address RADD0 is supplied to the corresponding bank in the RAM 42. Meanwhile, the read address RADD1, RADD2 of alternate order, as shown in table 3, from PLA 52 are selected by the first multiplexer 53 when the DCT coefficients are scanned in the alternate manner. The selected read address RADD1, RADD2 are supplied to the corresponding bank in the RAM 42.

In the second multiplexer 54, according to a coding mode discriminating signal INTER/INTRA from the system control unit (not shown), the output data DATA1A, DATA1B of the first and the second sub-RAMs BANK1A, BANK1B are selected for the inter mode coding, whereas the output data DATA2A, DATA2B of the third and the fourth sub-RAMs BANK2A, BANK2B are selected for the intra mode coding.

In the packing unit 55, upper and lower bits of two couples of 16 bit matrix data are combined selectively as 16 bit matrix couple data. The packed 16 bit matrix couple data are synchronized with the count value of the second counter 51 and they are outputted to the arithmetic controller 46. The following table 4 shows examples of data combination when the coding mode of the DCT coefficients is the inter coding and the scanning manner is the zigzag scanning.

TABLE 4

Examples of Data Combination (Zigzag scanning)

| counter value of the second counter (51) | data combination (BANK1A & BANK1B) | output matrix data couple |
|---|---|---|
| 00 | DATA1A(16~8) & DATA1B(7~0) | (00, 01) |
| 01 | DATA1A(16~8) & DATA1B(7~0) | (02, 03) |
| 02 | DATA1A(16~8) & DATA1B(7~0) | (04, 05) |
| 03 | DATA1A(16~8) & DATA1B(7~0) | (06, 07) |
| 04 | DATA1A(16~8) & DATA1B(7~0) | (08, 09) |
| 05 | DATA1A(16~8) & DATA1B(7~0) | (0A, 0B) |
| 06 | DATA1A(16~8) & DATA1B(7~0) | (0C, 0D) |
| 07 | DATA1A(16~8) & DATA1B(7~0) | (0E, 0F) |
| 08 | DATA1A(16~8) & DATA1B(7~0) | (10, 11) |
| 09 | DATA1A(16~8) & DATA1B(7~0) | (12, 13) |
| 0A | DATA1A(16~8) & DATA1B(7~0) | (14, 15) |
| 0B | DATA1A(16~8) & DATA1B(7~0) | (16, 17) |
| 0C | DATA1A(16~8) & DATA1B(7~0) | (18, 19) |
| 0D | DATA1A(16~8) & DATA1B(7~0) | (1A, 1B) |
| 0E | DATA1A(16~8) & DATA1B(7~0) | (1C, 1D) |
| 0F | DATA1A(16~8) & DATA1B(7~0) | (1E, 1F) |
| 10 | DATA1A(16~8) & DATA1B(7~0) | (20, 21) |
| 11 | DATA1A(16~8) & DATA1B(7~0) | (22, 23) |
| 12 | DATA1A(16~8) & DATA1B(7~0) | (24, 25) |
| 13 | DATA1A(16~8) & DATA1B(7~0) | (26, 27) |
| 14 | DATA1A(16~8) & DATA1B(7~0) | (28, 29) |
| 15 | DATA1A(16~8) & DATA1B(7~0) | (2A, 2B) |
| 16 | DATA1A(16~8) & DATA1B(7~0) | (2C, 2D) |
| 17 | DATA1A(16~8) & DATA1B(7~0) | (2E, 2F) |
| 18 | DATA1A(16~8) & DATA1B(7~0) | (30, 31) |
| 19 | DATA1A(16~8) & DATA1B(7~0) | (32, 33) |
| 1A | DATA1A(16~8) & DATA1B(7~0) | (34, 35) |
| 1B | DATA1A(16~8) & DATA1B(7~0) | (36, 37) |
| 1C | DATA1A(16~8) & DATA1B(7~0) | (38, 39) |
| 1D | DATA1A(16~8) & DATA1B(7~0) | (3A, 3B) |
| 1E | DATA1A(16~8) & DATA1B(7~0) | (3C, 3D) |
| 1F | DATA1A(16~8) & DATA1B(7~0) | (3E, 3F) |

Furthermore, the following table 5 shows examples when the coding mode of the DCT coefficients is the inter coding and the scanning manner is the alternate scanning.

TABLE 5

Examples of Data Combination (Alternate Scanning)

| The second counter (51) value of count | data combination (BANK1A & BANK1B) | output matrix data couple |
|---|---|---|
| 00 | DATA1A(16~8) & DATA1B(16~8) | (00, 02) |
| 01 | DATA1A(7~0) & DATA1B(7~0) | (03, 09) |
| 02 | DATA1B(7~0) & DATA1A(16~8) | (01, 04) |
| 03 | DATA1B(7~0) & DATA1A(7~0) | (05, 07) |
| 04 | DATA1A(16~8) & DATA1B(7~0) | (08, 0B) |
| 05 | DATA1A(16~8) & DATA1B(16~8) | (0A, 14) |
| 06 | DATA1A(7~0) & DATA1B(7~0) | (15, 23) |
| 07 | DATA1B(16~8) & DATA1A(16~8) | (24, 22) |
| 08 | DATA1A(16~8) & DATA1B(7~0) | (16, 13) |
| 09 | DATA1A(16~8) & DATA1B(16~8) | (12, 0C) |
| 0A | DATA1B(16~8) & DATA1A(7~0) | (06, 0D) |
| 0B | DATA1A(16~8) & DATA1B(16~8) | (0E, 10) |
| 0C | DATA1A(7~0) & DATA1B(16~8) | (11, 18) |
| 0D | DATA1B(7~0) & DATA1A(7~0) | (17, 21) |
| 0E | DATA1A(7~0) & DATA1B(16~8) | (25, 30) |
| 0F | DATA1B(16~8) & DATA1A(16~8) | (20, 26) |
| 10 | DATA1B(7~0) & DATA1A(7~0) | (2F, 31) |
| 11 | DATA1A(7~0) & DATA1B(7~0) | (19, 1F) |
| 12 | DATA1B(7~0) & DATA1A(16~8) | (0F, 1A) |

TABLE 5-continued

Examples of Data Combination (Alternate Scanning)

| The second counter (51) value of count | data combination (BANK1A & BANK1B) | output matrix data couple |
|---|---|---|
| 13 | DATA1B(7~0) & DATA1A(7~0) | (1B, 1D) |
| 14 | DATA1A(16~8) & DATA1B(16~8) | (1E, 28) |
| 15 | DATA1B(7~0) & DATA1A(16~8) | (27, 2E) |
| 16 | DATA1A(16~8) & DATA1B(7~0) | (32, 39) |
| 17 | DATA1A(7~0) & DATA1B(7~0) | (2D, 33) |
| 18 | DATA1A(16~8) & DATA1B(16~8) | (38, 3A) |
| 19 | DATA1A(7~0) & DATA1B(16~8) | (29, 2C) |
| 1A | DATA1B(16~8) & DATA1A(16~8) | (1C, 2A) |
| 1B | DATA1B(7~0) & DATA1A(7~0) | (2B, 35) |
| 1C | DATA1B(16~8) & DATA1A(7~0) | (34, 37) |
| 1D | DATA1A(7~0) & DATA1B(16~8) | (3B, 3E) |
| 1E | DATA1B(16~8) & DATA1A(16~8) | (36, 3C) |
| 1F | DATA1B(7~0) & DATA1A(7~0) | (3D, 3F) |

The arithmetic controller 46 is operated according to the system clock CLK and the reset signal RST. The quantization matrix from the RAM controller 44 is inputted in the arithmetic controller 46 and its reciprocal value is calculated. Additionally, the quantization type QUANT_SCALE_TYPE and the quantization code QUANT_SCALE_CODE signal from the system control unit (not shown) are inputted from the RAM controller 44 to the arithmetic controller 46. A quantization scale value is obtained by calculating the quantization type QUANT_SCALE_TYPE and the quantization code QUANT_SCALE_CODE. Therefrom, a reciprocal number of the quantization scale value is obtained. A DC value is obtained by a DC_PREC value from the system control unit (not shown). A reciprocal number of the DC value is obtained therefrom. At this time, the quantization matrix value, the quantization scale value, and the DC value containing the reciprocal number, respectively from the arithmetic controller 46 are outputted to the arithmetic unit 48. Furthermore, for the 16 bit matrix couple data, its reciprocal number is obtained in 8 bit units.

In the arithmetic unit 48, DCT coefficients of 2 pixels DATA_EVEN, DATA_ODD are multiplied by the reciprocal number of the quantization scale value from the arithmetic controller 46. The calculated value is multiplied by the reciprocal number of the quantization matrix value and a round processing for the value is performed. The quantized data of 2 pixels QUANT_EVEN, QUANT_ODD are outputted therefrom. At this time, the calculation in the arithmetic unit 48 is performed by a pipe line manner. Hence, a processing speed can be improved. Furthermore, the input order of the DCT coefficients and the order of the quantization matrix can be matched to each other according to the scanning manner when quantizing.

Thus, according to the first embodiments of the present invention, the same inter quantization matrix is stored in two sub-RAMs and the same intra quantization matrix is stored in two sub-RAMs, respectively in order of the zigzag scanning manner, thus corresponding quantization matrix is read from a memory without data collision, according to the read address based on the scanned manner of DCT coefficients.

Figure 6:
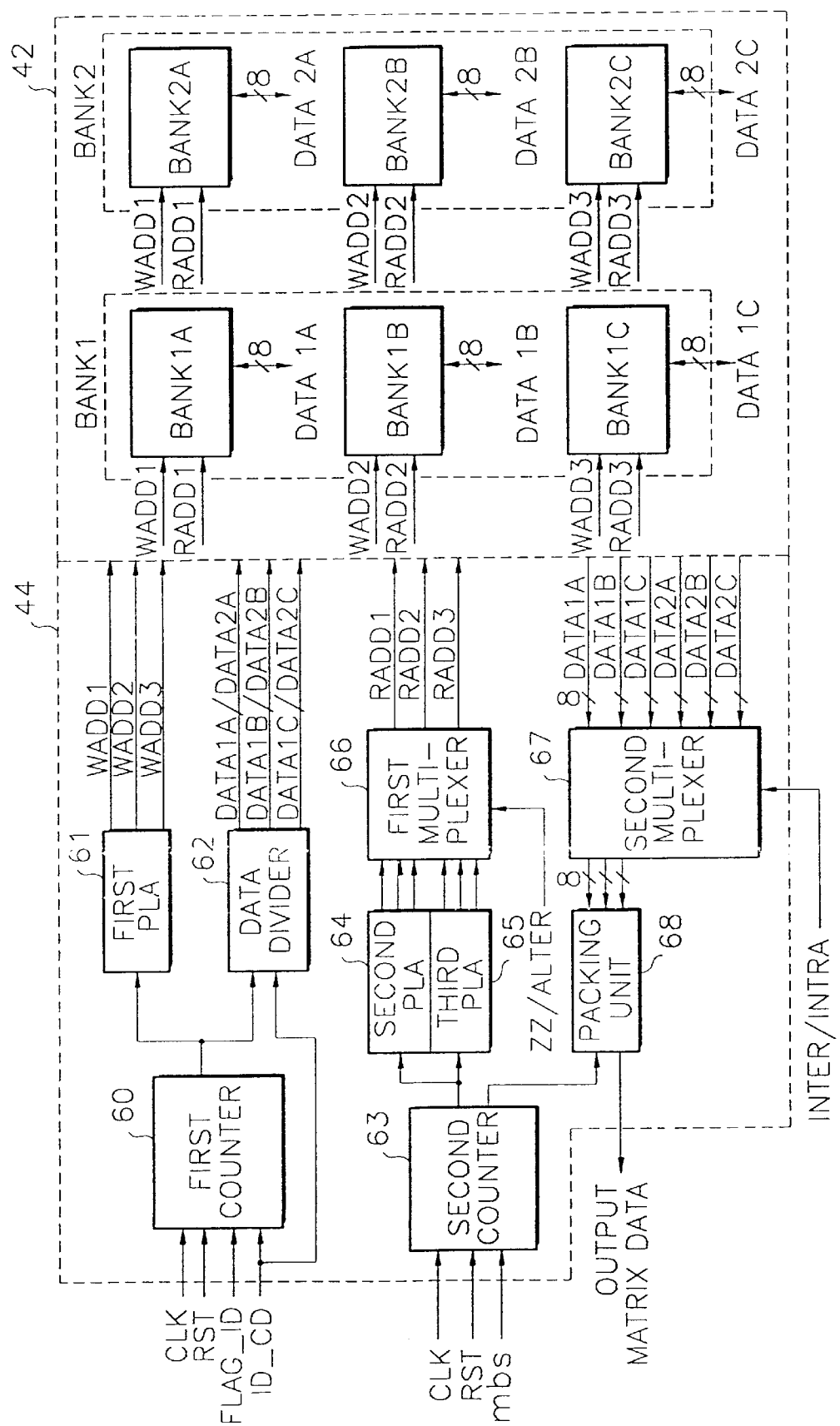
FIG. 6 is a detailed block diagram illustrating a RAM and a RAM controller in accordance with a second preferred embodiment of the present invention.

FIG. 6 shows a detailed block diagram of a RAM 42 and a RAM controller 44 in accordance with a second preferred embodiment. The RAM 42 comprises a first bank BANK1 for storing the inter quantization matrix and a second bank BANK2 for storing the intra quantization matrix. The first bank BANK1 comprises a first sub-RAM and a second sub-RAM BANK1A, BANK1B having 8 bits×22 words, and a third sub-RAM BANK1C having 8 bits×20 words. The second bank BANK2 comprises a fourth sub-RAM BANK2A and a fifth sub-RAM BANK2B having 8 bits×22 words, and a sixth sub-RAM BANK2C having 8 bits×20 words.

The RAM controller 44 comprises a write address generator, a first counter 60 and a first PLA 61, for generating a write address to store the inter quantization matrix and the intra quantization matrix into the RAM 42; a data divider 62 for dividing matrix data of ID_CD into a corresponding sub-RAM of each bank; a read address generator, a second counter 63, a second PLA 64, a third PLA 65, and a first multiplexer 66, for generating a read address to read a corresponding quantization matrix from the RAM 42 according to a scanning manner for DCT coefficients; a data combiner, a second multiplexer 67 and a packing unit 68, for combining the matrix data from the RAM 42 in 16 bits according to a coding mode or the scanning order.

FIGS. 4 and FIG. 6 will be referred to describe a second embodiment of the present invention in detail. As input/output signals to each block are the same as discussed in the first preferred embodiment, they will be omitted from the following elaboration.

In the first bank BANK1 of the RAM 42, 64 inter quantization matrix data are divided and stored in 8 bit units in 22 areas of the first sub-RAM BANK1A, 22 areas of the second sub-RAM BANK1B, 20 areas of the third sub-RAM BANK1C, respectively. Each area of the first to the third sub-RAMs BANK1A, BANK1B, BANK1C is indicated by the write addresses WADD1, WADD2, WADD3, respectively. For the second bank BANK2, 64 intra quantization matrix data are divided and stored in 8 bit units in 22 areas of the fourth sub-RAM BANK2A, 22 areas of the fifth sub-RAM BANK2B, 20 areas of the sixth sub-RAM BANK2C, respectively. Each area of the fourth to the sixth sub-RAMs BANK2A, BANK2B, BANK2C is indicated by the write addresses WADD1, WADD2, WADD3, respectively. The inter and the intra quantization matrix are supplied from the system control unit (not shown), and they may be an user defined matrix or a default matrix defined by MPEG-2.

The RAM controller 44 is operated by a system clock CLK and a reset signal RST such that the quantization matrixes of ID_CD are stored in corresponding banks of the RAM 42 according to the write addresses WADD1, WADD2, WADD3. Additionally, the quantization matrixes in the RAM 42 are read by read addresses RADD1, RADD2, RADD3 according to the scanning manner of the DCT coefficients and they are outputted to the arithmetic controller 46. Namely, in the RAM controller 44, ID_CD is analyzed to identify the quantization matrix type when FLAG_ID is a "high" logic level. The analyzed input quantization matrix is stored in a corresponding sub-RAM of each bank of the RAM 42. Additionally, on being synchronized by a macro block start signal mbs, the quantization matrixes in each sub-RAM of the banks are read and outputted to the arithmetic controller 46. Each sub-RAM has a control signal for reading and writing (not shown), and a control signal for enabling an output (not shown). The control signals are supplied when the corresponding sub-RAM is selected by the RAM controller 44.

As illustrated in FIG. 6, the first counter 60 (5 bits counter) counts $00_H$ to $1F_H$ according to a clock signal CLK after clearing a count value by reset signal RST. ID_CD are analyzed to identify the inter/intra quantization matrix when FLAG_ID is a "high" logic level. 32 count values are outputted to the first PLA 61 and the data divider 62 once ID is identified.

In the first PLA 61, the writ addresses WADD1, WADD2, WADD3 are generated to store the quantization matrix from the system control unit (not shown) in 8 bit units in the first to the third sub-RAM BANK1A, BANK1B, BANK3, or the fourth to the sixth sub-RAM BANK2A, BANK2B, BANK2C according to the count value from the first counter 60. The first PLA 61 also generates the read addresses RADD1, RADD2, RADD3 when the DCT coefficients are scanned in the zigzag order. The following table 6 illustrates the write addresses WADD1, WADD2, WADD3.

TABLE 6

Write Address

| Count value of the first counter (60) | WADD2 address (data) | WADD2 address (data) | WADD3 address (data) |
|---|---|---|---|
| 00 | 00(00) | 00(01) | — |
| 01 | — | 01(03) | 00(02) |
| 02 | 01(04) | 02(05) | — |
| 03 | 02(06) | — | 01(07) |
| 04 | 03(08) | — | 02(09) |
| 05 | — | 03(0B) | 03(0A) |
| 06 | 04(0C) | 04(0D) | — |
| 07 | — | 05(0F) | 04(0E) |
| 08 | 05(10) | 06(11) | — |
| 09 | — | 07(13) | 05(12) |
| 0A | 06(14) | 08(15) | — |
| 0B | 07(16) | — | 06(17) |
| 0C | 08(18) | 09(19) | — |
| 0D | 09(1A) | 0A(1B) | — |
| 0E | 0A(1C) | — | 07(1D) |
| 0F | 0B(1E) | — | 08(1F) |
| 10 | — | 0B(21) | 09(20) |
| 11 | 0C(22) | — | 0A(23) |
| 12 | — | 0C(25) | 0B(24) |
| 13 | 0D(26) | 0D(27) | — |
| 14 | — | 0E(29) | 0C(28) |
| 15 | — | 0F(2B) | 0D(2A) |
| 16 | 0E(2C) | — | 0E(2D) |
| 17 | 0F(2E) | 10(2F) | — |
| 18 | 10(30) | — | 0F(31) |
| 19 | 11(32) | 11(33) | — |
| 1A | 12(34) | — | 10(35) |
| 1B | — | 12(37) | 11(36) |
| 1C | 13(38) | 13(39) | — |
| 1D | — | 14(3B) | 12(3A) |
| 1E | 14(3C) | 15(3D) | — |
| 1F | 15(3E) | — | 13(3F) |

In the data divider 62, 16 bit quantization matrix data of the zigzag order as shown in FIG. 3A, are divided to store in two of 3 sub-RAMs in 8 bit units according to the count value from the first counter 60. In case of the inter quantization matrix, the 16 bit quantization matrix data are divided to store in the first to the third sub-RAMs BANK1A, BANK1B, BANK1C. In case of the intra quantization matrix, the 16 bit quantization matrix data are divided to store in the fourth to the sixth sub-RAMs BANK2A, BANK2B, BANK2C. The following table 7 illustrates the data division.

TABLE 7

Data Division (Inter Quantization Matrix)

| count value of the first counter (60) | Input |
|---|---|
| 00 | BANK1A & BANK1B |
| 01 | BANK1C & BANK1B |
| 02 | BANK1A & BANK1B |
| 03 | BANK1A & BANK1C |
| 04 | BANK1A & BANK1C |
| 05 | BANK1C & BANK1B |
| 06 | BANK1A & BANK1B |
| 07 | BANK1C & BANK1B |
| 08 | BANK1A & BANK1B |
| 09 | BANK1C & BANK1B |
| 0A | BANK1A & BANK1B |
| 0B | BANK1A & BANK1C |
| 0C | BANK1A & BANK1B |
| 0D | BANK1A & BANK1B |
| 0E | BANK1A & BANK1C |
| 0F | BANK1A & BANK1C |
| 10 | BANK1C & BANK1B |
| 11 | BANK1A & BANK1C |
| 12 | BANK1C & BANK1B |
| 13 | BANK1A & BANK1B |
| 14 | BANK1C & BANK1B |
| 15 | BANK1C & BANK1B |
| 16 | BANK1A & BANK1C |
| 17 | BANK1A & BANK1B |
| 18 | BANK1A & BANK1C |
| 19 | BANK1A & BANK1B |
| 1A | BANK1A & BANK1C |
| 1B | BANK1C & BANK1B |
| 1C | BANK1A & BANK1B |
| 1D | BANK1C & BANK1B |
| 1E | BANK1A & BANK1B |
| 1F | BANK1A & BANK1C |

The above tables 6 and 7 shows the inter quantization matrix stored in the first to the third sub-RAMs BANK1A, BANK1B, BANK1C. When the count value is $00_{16}$, the matrix data (00) are stored in the area of the write address WADD1 '00' of the first sub-RAM BANK1A and the matrix data (01) are stored in the area of the write address WADD2 '01' of the second sub-RAM BANK1B. When the counter value is $01_{16}$, the matrix data (03) are stored in the area of the write address WADD2 '01' of the second sub-RAM BANK1B and the matrix data (02) are stored in the area of the write address WADD3 '00' of the third sub-RAM BANK1C. Namely, the inter quantization matrix data of the zigzag order in 16 bit units, as in FIG. 3A, are stored in two sub-RAMs of the first to the third sub-RAMs as shown in table 7 in 8 bit units according to the write addresses WADD1, WADD2, WADD3. Similarly, the intra quantization matrix data of the zigzag order in 16 bit units, as in FIG. 3A, are stored in two sub-RAMs of the fourth to the six sub RAMs as shown in table 7 in 8 bit units according to the write addresses WADD1, WADD2, WADD3. At this time, the sub-RAM for allocating the address in the table 6 correspond to the sub-RAM for dividing the data in the table 7 when the count value is the same.

The second counter 63 (5 bit counter) counts $00_H$ to $1F_H$ according to the clock signal CLK after clearing the count signal by the reset signal RST. The 32 count values are outputted to the second PLA 64, the third PLA 65, and the packing unit 68 after detecting a rising edge of macro block signal mbs.

In the second PLA 64, the read addresses RADD1, RADD2, RADD3 are generated to read the corresponding quantization matrix from the RAM 42 when the DCT coefficients are scanned in the zigzag order. The second PLA 64 has the same construction as the first PLA 61. The read addresses RADD1, RADD2, RADD3 like in the following table 8 are generated in the second PLA 64 according to the count value from the second counter 63.

TABLE 8

Read Address (Zigzag Scanning)

| Count value of the second counter (60) | RADD1 address (data) | RADD2 address (data) | RADD3 address (data) |
|---|---|---|---|
| 00 | 00(00) | 00(01) | — |
| 01 | — | 01(03) | 00(02) |
| 02 | 01(04) | 02(05) | — |
| 03 | 02(06) | — | 01(07) |
| 04 | 03(08) | — | 02(09) |
| 05 | — | 03(0B) | 03(0A) |
| 06 | 04(0C) | 04(0D) | — |
| 07 | — | 05(0F) | 04(0E) |
| 08 | 05(10) | 06(11) | — |
| 09 | — | 07(13) | 05(12) |
| 0A | 06(14) | 08(15) | — |
| 0B | 07(16) | — | 06(17) |
| 0C | 08(18) | 09(19) | — |
| 0D | 09(1A) | 0A(1B) | — |
| 0E | 0A(1C) | — | 07(1D) |
| 0F | 0B(1E) | — | 08(1F) |
| 10 | — | 0B(21) | 09(20) |
| 11 | 0C(22) | — | 0A(23) |
| 12 | — | 0C(25) | 0B(24) |
| 13 | 0D(26) | 0D(27) | — |
| 14 | — | 0E(29) | 0C(28) |
| 15 | — | 0F(2B) | 0D(2A) |
| 16 | 0E(2C) | — | 0E(2D) |
| 17 | 0F(2E) | 10(2F) | — |
| 18 | 10(30) | — | 0F(31) |
| 19 | 11(32) | 11(33) | — |
| 1A | 12(34) | — | 10(35) |
| 1B | — | 12(37) | 11(36) |
| 1C | 13(38) | 13(39) | — |
| 1D | — | 14(3B) | 12(3A) |
| 1E | 14(3C) | 15(3D) | — |
| 1F | 15(3E) | — | 13(3F) |

In the third PLA 65, the read addresses RADD1, RADD2, RADD3 are generated to read the corresponding quantization matrix from the RAM 42 when the DCT coefficients are scanned in the alternate order. The read addresses RADD1, RADD2, RADD3 like the following table 9 are generated in the third PLA 65 according to the count value from the second counter 63.

TABLE 9

Read Address (Alternate Scanning)

| Count value of the second counter (63) | RADD 1 address (data) | RADD2 address (data) | RADD3 address (data) |
|---|---|---|---|
| 00 | 00(00) | — | 00(02) |
| 01 | — | 01(03) | 02(09) |
| 02 | 01(04) | 00(01) | — |
| 03 | — | 02(05) | 01(07) |
| 04 | 03(08) | 03(0B) | — |
| 05 | 06(14) | — | 03(0A) |
| 06 | — | 08(15) | 0A(23) |
| 07 | 0C(22) | — | 0B(24) |
| 08 | 07(13) | 07(13) | — |
| 09 | 04(0C) | — | 05(12) |
| 0A | 02(06) | 04(0D) | — |
| 0B | 05(10) | — | 04(0E) |
| 0C | 08(18) | 06(11) | — |
| 0D | — | 0B(21) | 06(17) |
| 0E | 10(30) | 0C(25) | — |
| 0F | 0D(26) | — | 09(20) |
| 10 | — | 10(2F) | 0F(31) |
| 11 | — | 09(19) | 08(1F) |
| 12 | 09(1A) | 05(0F) | — |

TABLE 9-continued

Read Address (Alternate Scanning)

| Count value of the second counter (63) | RADD 1 address (data) | RADD2 address (data) | RADD3 address (data) |
|---|---|---|---|
| 13 | — | 0A(1B) | 07(1D) |
| 14 | 0B(1E) | — | 0C(28) |
| 15 | 0F(2E) | 0D(27) | — |
| 16 | 11(32) | 13(39) | — |
| 17 | — | 11(33) | 0E(2D) |
| 18 | 13(38) | — | 12(3A) |
| 19 | 0E(2C) | 0E(29) | — |
| 1A | 0A(1C) | — | 0D(2A) |
| 1B | — | 0F(2B) | 10(35) |
| 1C | 12(34) | 12(37) | — |
| 1D | 15(3E) | 14(3B) | — |
| 1E | 14(3C) | — | 11(36) |
| 1F | — | 15(3D) | 13(3F) |

The above table 9 shows the inter quantization matrix data read from the first to the third sub-RAMs BANK1A, BANK1B, BANK1C. When the count value is $00_{16}$, the read address RADD1 is generated to read the data (00) stored in the write address '00' from the first sub-RAM BANK1A, and the read address RADD3 is generated to read the data (02) stored the write address '00' from the third sub-RAM BANK1C. In addition, when the count value is $01_{16}$, the read address RADD2 is generated to read the data (03) stored in the write address '01' from the second sub-RAM BANK1B, and the read address RADD3 is generated to read the data (09) stored in the write address '02' from the third sub-RAM BANK1C. Namely, the matrix data, which are stored in the areas of the first to the third sub-RAMs BANK1A, BANK1B, BANK1C indicated respectively by the read addresses RADD1, RADD2, RADD3, are read in the order shown in FIG. 3B according to the count values $00_{16}$–$1F_{16}$. In the same manner, in case of the intra quantization, the matrix data, which are stored in the areas of the fourth to the sixth sub-RAMs BANK2A, BANK2B, BANK2C indicated respectively by the read addresses RADD1, RADD2, RADD3, are read in the order shown in FIG. 3B according to the count values $00_{16}$–$1F_{16}$. As described above, the read address from the third PLA 65 is not sequential for reading the matrix data of the zigzag order in 3 sub-RAMs in the alternate order. For this reason, a matrix data is distributed and stored in two of 3 sub-RAMs by write address generated in the first PLA 61 such that the data collision phenomenon does not occur when a couple of matrix data are read by the read address generated in the third PLA 65 according to a scanning manner.

In the first multiplexer 66, the read addresses RADD1, RADD2, RADD3 of the zigzag order, or the read addresses RADD1, RADD2, RADD3 of the alternate order are outputted selectively to the RAM 42 according to the scanned manner discriminating signal ZZ/ALTER from the system control unit (not shown). For example, in the first multiplexer 66, the read addresses RADD1, RADD2, RADD3 of the zigzag order from the second PLA 64 like the table 8 are supplied selectively to the corresponding bank of the RAM 42 when the DCT coefficients are scanned in the zigzag manner. Meanwhile, in the first multiplexer 66, the read addresses RADD1, RADD2, RADD3 of the alternate order from the third PLA 65 like the table 9 are supplied selectively to the corresponding bank of the RAM 42 when the DCT coefficients are scanned in the alternating manner.

In the second multiplexer 67, according to the code mode discriminating signal INTER/INTRA from the system control unit (not shown), the output data DATA1A, DATA1B, DATA1C of the first to the third sub-RAMs BANK1A, BANK1B, BANK1C are outputted selectively for the inter coding mode, and the output data DATA2A, DATA2B, DATA2C of the fourth to the sixth sub-RAMs BANK2A, BANK2B, BANK2C are outputted selectively for the intra coding mode.

In the packing unit 68, two couples of 8 bit matrix data from the second multiplexer 67 are combined as 16 bit matrix couple data. The data are synchronized to the count value of the second counter 63 and they are outputted to the arithmetic controller 46. The following table 10 shows the case that the coding mode of the DCT coefficients is the inter coding and its scanning manner is of zigzag scanning.

TABLE 10

Examples of Data Combination (Zigzag Scanning)

| counter value of the second counter (63) | data combination (BANK1A & BANK1B & BANK1C) | output matrix data couple |
|---|---|---|
| 00 | DATA1A & DATA1B | (00, 01) |
| 01 | DATA1C & DATA1B | (02, 03) |
| 02 | DATA1A & DATA1B | (04, 05) |
| 03 | DATA1A & DATA1C | (06, 07) |
| 04 | DATA1A & DATA1C | (08, 09) |
| 05 | DATA1C & DATA1B | (0A, 0B) |
| 06 | DATA1A & DATA1B | (0C, 0D) |
| 07 | DATA1C & DATA1B | (0E, 0F) |
| 08 | DATA1A & DATA1B | (10, 11) |
| 09 | DATA1C & DATA1B | (12, 13) |
| 0A | DATA1A & DATA1B | (14, 15) |
| 0B | DATA1A & DATA1C | (16, 17) |
| 0C | DATA1A & DATA1B | (18, 19) |
| 0D | DATA1A & DATA1B | (1A, 1B) |
| 0E | DATA1A & DATA1C | (1C, 1D) |
| 0F | DATA1A & DATA1C | (1E, 1F) |
| 10 | DATA1C & DATA1B | (20, 21) |
| 11 | DATA1A & DATA1C | (22, 23) |
| 12 | DATA1C & DATA1B | (24, 25) |
| 13 | DATA1A & DATA1B | (26, 27) |
| 14 | DATA1C & DATA1B | (28, 29) |
| 15 | DATA1C & DATA1B | (2A, 2B) |
| 16 | DATA1A & DATA1C | (2C, 2D) |
| 17 | DATA1A & DATA1B | (2E, 2F) |
| 18 | DATA1A & DATA1C | (30, 31) |
| 19 | DATA1A & DATA1B | (32, 33) |
| 1A | DATA1A & DATA1C | (34, 35) |
| 1B | DATA1C & DATA1B | (36, 37) |
| 1C | DATA1A & DATA1B | (38, 39) |
| 1D | DATA1C & DATA1B | (3A, 3B) |
| 1E | DATA1A & DATA1B | (3C, 3D) |
| 1F | DATA1A & DATA1C | (3E, 3F) |

Furthermore, the following table 11 shows the case that the coding mode of the DCT coefficients is the inter coding and its scanning manner is of alternate scanning.

TABLE 11

Examples of Data Combination (Alternate Scanning)

| count value of the second counter (63) | data combination (BANK1A & BANK1B &BANK1C) | output matrix data couple |
|---|---|---|
| 00 | DATA1A & DATA1C | (00,02) |
| 01 | DATA1B & DATA1C | (03, 09) |
| 02 | DATA1B & DATA1A | (01, 04) |
| 03 | DATA1B & DATA1C | (05, 07) |
| 04 | DATA1A & DATA1B | (08, 0B) |
| 05 | DATA1C & DATA1A | (0A, 14) |
| 06 | DATA1B & DATA1C | (15, 23) |
| 07 | DATA1C & DATA1A | (24, 22) |

TABLE 11-continued

Examples of Data Combination (Alternate Scanning)

| count value of the second counter (63) | data combination (BANK1A & BANK1B &BANK1C) | output matrix data couple |
|---|---|---|
| 08 | DATA1A & DATA1B | (16, 13) |
| 09 | DATA1C & DATA1A | (12, 0C) |
| 0A | DATA1A & DATA1B | (06, 0D) |
| 0B | DATA1C & DATA1A | (0E, 10) |
| 0C | DATA1B & DATA1A | (11, 18) |
| 0D | DATA1C & DATA1B | (17, 21) |
| 0E | DATA1B & DATA1A | (25, 30) |
| 0F | DATA1C & DATA1A | (20, 26) |
| 10 | DATA1B & DATA1C | (2F, 31) |
| 11 | DATA1B & DATA1C | (19, 1F) |
| 12 | DATA1B & DATA1A | (0F, 1A) |
| 13 | DATA1B & DATA1C | (1B, 1D) |
| 14 | DATA1A & DATA1C | (1E, 28) |
| 15 | DATA1B & DATA1A | (27, 2E) |
| 16 | DATA1A & DATA1B | (32, 39) |
| 17 | DATA1C & DATA1B | (2D, 33) |
| 18 | DATA1A & DATA1C | (38, 3A) |
| 19 | DATA1B & DATA1A | (29, 2C) |
| 1A | DATA1A & DATA1C | (1C, 2A) |
| 1B | DATA1B & DATA1C | (2B, 35) |
| 1C | DATA1A & DATA1B | (34, 37) |
| 1D | DATA1B & DATA1A | (3B, 3E) |
| 1E | DATA1C & DATA1A | (36, 3C) |
| 1F | DATA1B & DATA1C | (3D, 3F) |

Here, the discussion of the arithmetic controller 46 and the arithmetic unit 48 is omitted since the operating procedures are same as described in the first embodiments.

Thus, according to the second embodiments of the present invention, 32 quantization matrix data of 16 bits unit are distributed and stored in two of 3 sub-rams in order of the zigzag scanning manner in unit of 8 bits, thus corresponding quantization matrix is read from a memory without data collision, according to the read address based on the scanned manner of DCT coefficients.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A quantizer for quantizing scanned DCT coefficients in a video encoder, comprising:

a) a memory having a first bank with a plurality of areas for storing an inter quantization matrix; and a second bank with a plurality of areas for storing an intra quantization matrix;

b) a memory controller for generating a write address for writing the inter quantization matrix and the intra quantization matrix in said memory in an order of a zigzag scanning manner, and a read address for reading a corresponding quantization matrix from said memory in an order of a scanning manner of the DCT coefficients, and controlling a write/read process of the inter quantization matrix and the intra quantization matrix in said memory according to the write address and the read address;

c) an arithmetic controller for obtaining a reciprocal of a value of the corresponding quantization matrix provided from said memory via said memory controller and a reciprocal of a value of a quantization scale provided externally and outputting the obtained reciprocal values; and d) an arithmetic unit for quantizing the scanned DCT coefficients by using the reciprocal values of the corresponding quantization matrix and the quantization scale supplied from said arithmetic controller.

2. A quantizer for quantizing scanned DCT coefficients in a video encoder, comprising:

a) a RAM having a first bank with a first sub-RAM and a second sub-RAM for storing an identical inter quantization matrix, and a second bank with a third sub-RAM and a fourth sub-RAM for storing an identical intra quantization matrix;

b) a RAM controller for generating a write address for writing the inter quantization matrix and the intra quantization matrix in corresponding sub-RAMs in an order of a zigzag scanning manner, and a read address for reading a corresponding quantization matrix from said RAM in an order of scanned manner of the DCT coefficients, and combining the corresponding quantization matrix read from said RAM according to the read address in a predetermined format;

c) an arithmetic controller for obtaining a reciprocal of a value of the corresponding quantization matrix provided from said RAM via said RAM controller and a reciprocal of a value of a quantization scale provided externally and outputting the obtained reciprocal values; and d) an arithmetic unit for quantizing the scanned DCT coefficients by using the reciprocal values of the corresponding quantization matrix and the quantization scale provided from said arithmetic controller.

3. The quantizer of claim 2, wherein said first to fourth sub-RAMs have a size of 16 bits×32 words.

4. The quantizer of claim 2, wherein said RAM controller comprises:

a write address generator for generating the write address;

a read address generator for generating the read address;

a data combiner for combining the corresponding quantization matrix read from said RAM according to the read address in a predetermined format;

said write address generator having a first counter for counting a clock signal and generating 32 write addresses for storing the quantization matrix in the corresponding sub-RAMs in units of 16 bits;

said read address generator having a second counter for counting the clock signal and outputting 32 count values, a programmable logic array for generating a first read address for reading in an order of a zigzag scanning manner and a second read address for reading in an order of an alternate scanning manner the quantization matrix stored in said RAM, according to the 32 count values from said second counter, and a first multiplexer for outputting selectively the first read address and the second read address according to a scanning manner; and said data combiner having a second multiplexer for outputting selectively the inter quantization matrix and the intra quantization matrix read from said RAM according to the first read address and the second read address, based on a coding mode discriminating signal, and a packing unit for packing the quantization matrix provided from said second multiplexer in units of 16 bits, according to the 32 count values from said second counter and outputting the packed matrix.

5. A quantizer for quantizing scanned DCT coefficients in a video encoder, comprising:

a) a RAM having a first bank with a first, a second and a third sub-RAMs for storing an inter quantization matrix, and a second bank with a fourth, a fifth and a sixth sub-RAMs for storing an intra quantization matrix;

b) a RAM controller for generating a write address for writing the inter quantization matrix of 16 bit units in two sub-RAMs among said first to third sub-RAMs and the intra quantization matrix of 16 bit units in two sub-RAMs among said fourth to sixth sub-RAMs in an order of zigzag scanning manner in units of 8 bits, respectively, and a read address for reading a corresponding quantization matrix from said RAM in an order of scanning manner of the DCT coefficients, and combining the corresponding quantization matrix read from said RAM according to the read address in units of 16 bits;

c) an arithmetic controller for obtaining a reciprocal of a value of the corresponding quantization matrix provided from said RAM via said RAM controller and a reciprocal of a value of a quantization scale provided externally and outputting the obtained reciprocal values; and d) an arithmetic unit for quantizing the scanned DCT coefficients by using the reciprocal values of the corresponding quantization matrix and the quantization scale provided from said arithmetic controller.

6. The quantizer of claim 5, wherein said first, second, fourth and fifth sub-RAMs have a size of 8 bits×22 words and said third and sixth sub-RAMs have a size of 8 bits×20 words.

7. The quantizer of claim 5, wherein said RAM controller comprises:

a write address generator for generating the write address;

a data divider for distributing the quantization matrix in two sub-RAMs among corresponding three sub-RAMs;

a read address generator for generating the read address; and a data combiner for combining the corresponding quantization matrix read from said RAM according to the read address in units of 16 bits;

said write address generator having a first counter for counting a clock signal and outputting 32 count values, and a first programmable logic array for generating 32 write addresses for storing the quantization matrix in the corresponding sub-RAMs in units of 8 bits, according to the 32 count values from said first counter;

said read address generator having a second counter for counting the clock signal and outputting 32 count values, a second programmable logic array for generating a first read address for reading in an order of the zigzag scanning manner and a second read address for reading in an order of an alternate scanning manner the quantization matrix stored in said RAM, according to the 32 count values from said second counter, and a first multiplexer for outputting selectively the first read address and the second read address according to a scanning manner; and said data combiner having a second multiplexer for outputting selectively the inter quantization matrix and the intra quantization matrix read from said RAM according to the first and the second read addresses, based on a coding mode discriminating signal, and a packing unit for packing the quantization matrix supplied from said second multiplexer in units of 16 bits, according to the 32 count values from said second counter and outputting the packed matrix.

* * * * *